United States Patent
Wand

(10) Patent No.: US 8,778,223 B2
(45) Date of Patent: Jul. 15, 2014

(54) LIQUID CRYSTALS HAVING CYCLOHEXYL CORE STRUCTURES AND FLUORINATED TAILS

(75) Inventor: Michael Wand, Boulder, CO (US)

(73) Assignee: LC Vision, LLC, Boulder, CO (US)

(*) Notice: Subject to any disclaimer, the term of this patent is extended or adjusted under 35 U.S.C. 154(b) by 0 days.

(21) Appl. No.: 13/479,550

(22) Filed: May 24, 2012

(65) Prior Publication Data

US 2012/0326083 A1    Dec. 27, 2012

Related U.S. Application Data

(60) Provisional application No. 61/489,300, filed on May 24, 2011.

(51) Int. Cl.
| | |
|---|---|
| C09K 19/00 | (2006.01) |
| C09K 19/06 | (2006.01) |
| C09K 19/34 | (2006.01) |
| C09K 19/52 | (2006.01) |
| G02F 1/1333 | (2006.01) |
| C07C 17/00 | (2006.01) |
| C07C 19/08 | (2006.01) |
| C07C 23/00 | (2006.01) |
| C07C 25/13 | (2006.01) |

(52) U.S. Cl.
USPC ............ 252/299.63; 252/299.01; 252/299.6; 252/299.65; 428/1.1; 349/182; 570/101; 570/123; 570/124; 570/130

(58) Field of Classification Search
USPC ............ 252/299.01, 299.6, 299.63, 299.65; 428/1.1; 349/182; 570/101, 123, 124, 570/130
See application file for complete search history.

(56) References Cited

U.S. PATENT DOCUMENTS

| | | | |
|---|---|---|---|
| 3,510,519 | A | 5/1970 | Frejaville et al. |
| 3,900,557 | A | 8/1975 | Strathdee |
| 3,989,705 | A | 11/1976 | Werstiuk et al. |
| 4,421,865 | A | 12/1983 | Shen |
| 4,510,069 | A | 4/1985 | Eidenschink et al. |
| 4,820,443 | A | 4/1989 | Goto et al. |
| 4,871,472 | A | 10/1989 | Krause et al. |
| 4,943,384 | A | 7/1990 | Sucrow et al. |
| 4,986,931 | A | 1/1991 | Eidenschink et al. |
| 5,075,032 | A | 12/1991 | Hopf et al. |
| 5,149,820 | A | 9/1992 | Borretzen et al. |
| 5,186,868 | A | 2/1993 | Andres et al. |
| 5,405,550 | A * | 4/1995 | Michl et al. ............... 252/299.01 |
| 5,453,218 | A * | 9/1995 | Wand et al. ............... 252/299.01 |
| 5,605,990 | A | 2/1997 | Abiko et al. |
| 5,733,984 | A | 3/1998 | Nakahara et al. |
| 5,830,763 | A | 11/1998 | Junk et al. |
| 5,846,514 | A | 12/1998 | Foster et al. |
| 5,895,660 | A | 4/1999 | Hoffmann et al. |
| 5,961,880 | A | 10/1999 | Kirsch et al. |
| 6,056,895 | A | 5/2000 | Kirsch et al. |
| 6,221,335 | B1 | 4/2001 | Foster |
| 6,413,448 | B1 | 7/2002 | Wand et al. |
| 6,475,595 | B1 | 11/2002 | Bremer et al. |
| 6,551,666 | B2 | 4/2003 | Kirsch et al. |
| 6,737,124 | B2 | 5/2004 | Gough et al. |
| 7,008,675 | B2 | 3/2006 | Kornfield et al. |
| 7,029,730 | B2 | 4/2006 | Kirsch et al. |
| 7,057,055 | B2 | 6/2006 | Bergman et al. |
| 7,081,279 | B2 | 7/2006 | Kato et al. |
| 7,083,832 | B2 * | 8/2006 | Wand et al. .................. 428/1.1 |
| 7,195,719 | B1 * | 3/2007 | Wand et al. ............... 252/299.61 |
| 7,615,262 | B2 * | 11/2009 | Campbell et al. ............ 428/1.1 |
| 2002/0173666 | A1 | 11/2002 | Bergman et al. |
| 2005/0095455 | A1 | 5/2005 | Nomura et al. |
| 2006/0151743 | A1 | 7/2006 | Cheong et al. |
| 2007/0228324 | A1 | 10/2007 | Kilickiran et al. |

FOREIGN PATENT DOCUMENTS

| | | |
|---|---|---|
| DE | 19714231 | 10/1998 |
| DE | 19723275 | 12/1998 |
| DE | 10108447 A1 | 12/2001 |
| DE | 10303638 A1 | 11/2003 |
| DE | 102006036894 | 3/2007 |
| EP | 0458176 B1 | 8/1995 |
| EP | 0834491 A1 | 4/1998 |
| EP | 0668284 B1 | 6/1999 |
| EP | 1690916 B1 | 3/2008 |
| JP | 03044351 A | 2/1991 |
| JP | 08170078 A | 7/1996 |
| JP | 08325174 A | 12/1996 |
| WO | WO 86/05484 | 9/1986 |

OTHER PUBLICATIONS

G. W. Gray et al., "The Synthesis and Transition Temperatures of Some 4,4"-Dialkyl-and 4,4"-Alkoxyalkyl-1,1':4',1"-terphenyls with 2,3- or 2',3'-Difluoro Substitutents and of the Biphenyl Analogues," J. Chem. Soc. Perkin Trans. II 12:2041-2053, Dec. 1989.

S. M. Kelly et al., "Liquid Crystals for Electro-Optic Applications," Chaper 1 in: Handbook of Advanced Electronic and Photonic Materials and Devices, vol. 7: Liquid Crystals, Display and Laser Materials, H. S. Nalway (ed.), Academic Press, 2001, pp. 1-66.

P. Kirsch et al., "A Novel Type of Liquid Crystals Based on Axially Fluorinated Cyclohexane Units," Angew. Chem. Int. Ed. 37(4):484-489, 1998.

D. J. Kushner et al., "Pharmacological Uses and Perspectives of Heavy Water and Deuterated Compounds," Canadian Journal of Physiology and Pharmacology 77(2):79-88, Feb. 1999.

D. J. Plaut et al., "Structural Characterization of Crystalline Ternary Inclusion Compounds at the Air-Water Interface," J. Am. Chem. Soc. 125:15922-15934, 2003.

A. Solladie-Cavallo et al., "Asymmetric Expoxidation of trans-Olefins via Chiral Dioxiranes: A Possible Contribution of axial Approaches in the case of Tri- and Tetrasubstituted α-Fluoro Cyclohexanones," Eur. J. Org. Chem. 4557-4560, 2001.

\* cited by examiner

*Primary Examiner* — Geraldina Visconti

(74) *Attorney, Agent, or Firm* — Lathrop & Gage LLP

(57) ABSTRACT

Provided are compounds useful for use in liquid crystal mixtures to improve the properties of the mixture. In embodiments, the compound has two cyclohexyl ring and a tail containing one more fluorine atoms.

19 Claims, No Drawings

LIQUID CRYSTALS HAVING CYCLOHEXYL CORE STRUCTURES AND FLUORINATED TAILS

CROSS-REFERENCE TO RELATED APPLICATIONS

This application claims priority to U.S. provisional application Ser. No. 61/489,300 filed May 24, 2011, which is hereby incorporated by reference in its entirety.

BACKGROUND OF THE INVENTION

This disclosure relates generally to liquid crystals (LCs). Liquid crystals are useful in a variety of electrooptical and device display applications. There have been a variety of liquid crystal mixtures and compounds developed which have different properties. There is a need in the art for compounds having improved physical characteristics for devices and other applications.

Provided here are compounds which in an embodiment are useful as dopants in liquid crystal mixtures to impart improved properties to the mixtures. Compounds in this new class of LCs possess useful properties in mixtures, including broadening the active liquid crystalline temperature range, in particular, by lowering the freezing point, and improving the dielectric anisotropy.

SUMMARY OF THE INVENTION

In an embodiment, provided are bicyclohexyl liquid crystal dopants having a fluorinated tail. More specifically, in an embodiment, provided is a bicyclohexyl liquid crystal dopant having Formula I:

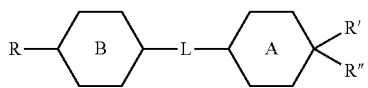

Formula I where in Formula I R' is H or F; R" is —H, —F, —CH2-F, —CHFCH2F, —CHFR$^a$, or

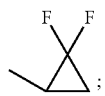

wherein R$^a$ is hydrogen or an alkyl group which has 1-8 C atoms in which any non-adjacent —CH2- group is optionally replaced by one or more of O atoms, —CO— groups, —CO—O— groups or —CH═CH— groups, and which alkyl group is optionally substituted with one or more halogen atoms which may be the same or different; the A ring is a cyclohexyl ring, and the B ring is one or more rings selected from the group consisting of: cyclohexyl; cyclohexenyl; phenyl; biphenyl; pyrimidinyl; pyridinyl; pyrazinyl; thiadiazolyl; naphthalenyl; dioxanyl; tetrahydropyranyl; dithianyl; or tetrahydrothiopyranyl; where any ring may independently include one or more substitutions including halogen;

L is selected from a single bond, —CH2CH2-, —CH═CH—, —C≡C—, —CO2-, —O2C—, —CF2O—, and —OCF2-;

R is hydrogen or an alkyl group which has 1-8 C atoms in which any non-adjacent —CH2- group is optionally replaced by one or more of O atoms, —CO— groups, —CO—O— groups or —CH═CH— groups, and which alkyl group is optionally substituted with one or more halogen atoms which may be the same or different.

In an embodiment, in Formula I, R" is —F, —CH2-F, —CHFCH2F, or

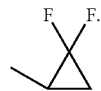

In an embodiment, in Formula I, in R, one or two non-adjacent —CH2- groups are optionally replaced by one or more of O atoms, —CO— groups, —CO—O— groups or —CH═CH— groups, and which alkyl group is optionally substituted with one or more halogen atoms which may be the same or different. In an embodiment, in Formula I, in R$^a$, one or two non-adjacent —CH2- groups are optionally replaced by one or more of O atoms, —CO— groups, —CO—O— groups or —CH═CH— groups, and which alkyl group is optionally substituted with one or more halogen atoms which may be the same or different. In an embodiment, R$^a$ is not hydrogen. In an embodiment, R$^a$ is hydrogen. In an embodiment, R is not hydrogen.

In an embodiment, provided is a compound of Formula II:

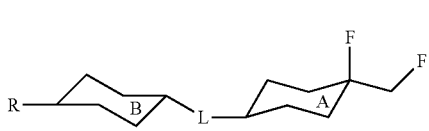

Formula II wherein the A ring is a cyclohexyl ring, and the B ring is one or more rings selected from the group consisting of: cyclohexyl; cyclohexenyl; phenyl; biphenyl; pyrimidinyl; pyridinyl; pyrazinyl; thiadiazolyl; naphthalenyl; dioxanyl; tetrahydropyranyl; dithianyl; or tetrahydrothiopyranyl; where any ring may independently include one or more substitutions including halogen; L is selected from a single bond, —CH2CH2-, —CH═CH—, —C≡C—, —CO2-, —O2C—, —CF2O—, and —OCF2-;

R is an alkyl group which has 1-8 C atoms and in which one or two non-adjacent CH2 groups are optionally replaced by one or more of O atoms, —CO— groups, —CO—O— groups or —CH═CH— groups, and which alkyl group is optionally substituted with one or more halogen atoms which may be the same or different. In an embodiment of Formula II, both rings are cyclohexyl.

In an embodiment, provided is a compound having Formula III:

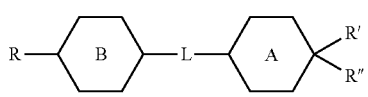

Formula III wherein in Formula III the A ring is a cyclohexyl ring, and the B ring is a cyclohexyl ring where any ring may independently include one or more substitutions including halogen;

L is selected from a single bond, —CH2CH2-, —CH═CH—, —C≡C—, —CO2-, —O2C—, —CF2O—, and —OCF2-;

R is an alkyl group which has 1-8 C atoms and in which one or two non-adjacent CH2 groups are optionally replaced by one or more of O atoms, —CO— groups, —CO—O— groups or —CH═CH— groups, and which alkyl group is optionally substituted with one or more halogen atoms which may be the same or different;

R' is H or F; R" is H, —F, —CH2-F, —CHFCH2F, —CHFR$^a$, or

wherein R$^a$ is hydrogen or an alkyl group which has 1-8 C atoms in which any non-adjacent —CH2- group is optionally replaced by one or more of O atoms, —CO— groups, —CO—O— groups or —CH═CH— groups, and which alkyl group is optionally substituted with one or more halogen atoms which may be the same or different.

In an embodiment of Formula III, R' is H or F; and R" is F, —CH2-F, —CHFCH2F, or

In an embodiment of Formula III, R' is F and R" is —CH2-F. In an embodiment of Formula III, R' is H and R" is —CHFCH2F. In an embodiment of Formula III, R' is H and R" is

where the line indicates attachment to the A ring.

In an embodiment, provided are compounds of Formula IV:

Formula IV

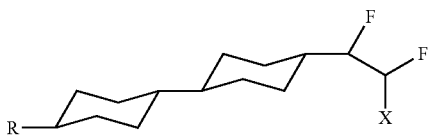

where in Formula IV X is F, H, or C1-C8 alkyl; R is an alkyl group which has 1-8 C atoms, where one or two non-adjacent CH2 groups are optionally replaced by one or more of O atoms, —CO— groups, —CO—O— groups or —CH═CH— groups, and which alkyl group is optionally substituted with one or more halogen atoms which may be the same or different.

The compounds described herein are generally tail-core-tail structures, where the tails may the same or different.

The core of the compounds described herein may be any suitable unit, such as one or two rings independently selected from the group consisting of: cyclohexyl; cyclohexenyl; phenyl; biphenyl; pyrimidinyl; pyridinyl; pyrazinyl; thiadiazolyl; naphthalenyl; dioxanyl; tetrahydropyranyl; dithianyl; or tetrahydrothiopyranyl, where any ring may independently have one or more fluorine substitutions.

The tails may have any suitable structure, including those described herein. In an embodiment, there are from two to six fluorines in any tail. The fluorines can interact with the core to form a "virtual ring". It is desired that the number of fluorines is not so great as to form a smectic liquid crystal.

In one embodiment, there are two rings in the compound and the rings are both cyclohexyl. In one embodiment, there are two rings in the compound and the rings are both cyclohexyl, one or both of which may have one or more fluorine atom substitutions.

In an embodiment of the compounds and formulas described herein, the R group is a C1-C6 alkyl group. In an embodiment of the compounds and formulas described herein, the R group is a C1-C4 alkyl group. In an embodiment of the compounds and formulas described herein, the R group is a C1-C3 alkyl group. In an embodiment of the compounds and formulas described herein, the R group is a C1-C6 alkyl group having one or more fluorine atoms. In an embodiment of the compounds and formulas described herein, the R group is a C1-C6 alkyl group having one fluorine atom. In an embodiment of the compounds and formulas described herein, the R group is a C1-C6 alkyl group having two fluorine atoms. In an embodiment of the compounds and formulas described herein, the R group is a C1-C6 alkyl group attached to the core with an oxygen atom.

In any group in the disclosure herein, any hydrogen may be replaced with deuterium.

In an embodiment of the compounds of Formula I, R' and R" together contain two fluorine atoms. In this embodiment, the two fluorine atoms are believed to couple to the core, contributing to the negative delta E of a liquid crystal incorporating the dopant. In general, the closer the difluoro-containing unit is to the core, the higher the delta E of the compound.

In an embodiment, the compounds described herein have a variety of number and arrangement of fluorine atoms in a tail. Some examples include 1,2-, 2,3-, 3,4-, or 4,5- or 5,6-difluoro tail unit. There may also be more than one fluorine at any of the carbon atoms in the tail such as 1,1,2-trifluoroethyl or 1,1,2,2-tetrafluoroethyl. The fluorine atom designations are counted with the first carbon atom attached to a ring as 1. In an embodiment, a tail is a cyclopropyl ring with one to three fluorine atoms, such as the following structure:

where the line indicates attachment to the core. In an embodiment, the compounds described herein include a 1,2-F or 1,2,2-F tail incorporated on a bicyclohexyl core.

The other tail may be any suitable structure, including the multifluoro tail unit described here or the tails as provided for variable R in Formula I.

In an embodiment, provided is a compound having the structure:

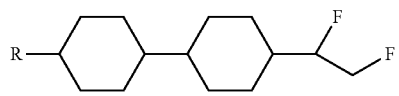

where R is an alkyl group which has 1-8 C atoms and in which one or two non-adjacent CH2 groups care optionally replaced one or more of O atoms, —CO— groups, —CO—O— groups or —CH=CH— groups, and which alkyl group is optionally substituted with one or more halogen atoms which may be the same or different.

In an embodiment, provided is a compound having the structure:

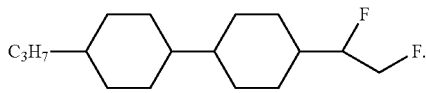

In an embodiment, provided is a compound having the structure:

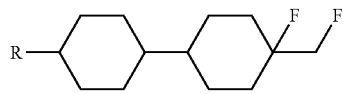

where R is an alkyl group which has 1-8 C atoms and in which one or two non-adjacent CH2 groups are optionally replaced one or more of O atoms, —CO— groups, —CO—O— groups or —CH=CH— groups, and which alkyl group are optionally substituted with one or more halogen atoms which may be the same or different.

In an embodiment, provided is a compound having the structure:

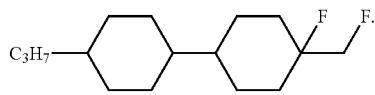

In an embodiment, provided is a compound having the structure:

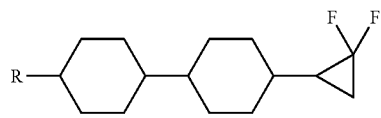

where R is an alkyl group which has 1-8 C atoms and in which one or two non-adjacent CH2 groups are optionally replaced one or more of O atoms, —CO— groups, —CO—O— groups or —CH=CH— groups, and which alkyl group are optionally substituted with one or more halogen atoms which may be the same or different.

In an embodiment, provided is a compound having the structure:

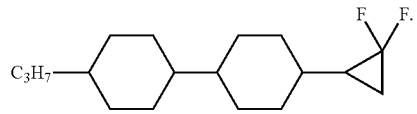

Also provided in an aspect is an optical device comprising: two opposing electrode surfaces, a liquid crystal composition having one or more compounds of the formulas and structures described herein disposed therebetween, wherein the optical device has improved properties including one or more of melting point, freezing point, dielectric anisotropy, and viscosity, as compared to an optical device containing no compounds of the formulas and structures described herein. Other property improvements will be understood by a review of the disclosure herein.

DETAILED DESCRIPTION OF THE INVENTION

Without wishing to be bound by any particular theory, there can be discussion herein of beliefs or understandings of underlying principles or mechanisms relating to the invention. It is recognized that regardless of the ultimate correctness of any explanation or hypothesis, an embodiment of the invention can nonetheless be operative and useful.

In general, the terms and phrases used herein have their art-recognized meaning, which can be found by reference to standard texts, journal references and contexts known to those skilled in the art. The definitions are provided to clarify their specific use in the context of the invention.

As used throughout the present description, the expression "a group corresponding to" or a "group" indicates a species which expressly includes a radical, including monovalent, divalent and polyvalent radicals for example, an aromatic or heterocyclic aromatic radical, of the groups listed provided in a covalently bonded configuration, optionally with one or more substituents, including but not limited to electron donating groups, electron withdrawing groups and/or other groups.

As used herein, "alkyl" groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. An alkoxy group is an alkyl group that has been modified by linkage to oxygen and can be represented by the formula R—O and may also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O—$.

In the formulas and compounds described and shown herein, if a variable is not defined, the variable should be taken to have the definition it would have in the analogous variable in Formula I or any other formula or variable described herein, if the valence is not correct in a formula, variable or substitution shown herein, it is understood that one of ordinary skill in the art would be able to understand the correct valence and correct the formula, variable or substitution.

As used herein, any grouping of substituents or groups or other grouping is intended to allow inclusion or exclusion of one or more members of the group for any purpose, including inclusion or exclusion of one or more members of the group in the claims. Aryl groups include groups having one or more 5- or 6-member aromatic or heteroaromatic rings. Heteroaryl groups are aryl groups having one or more heteroatoms (N, O or S) in the ring. Aryl groups can contain one or more fused aromatic rings. Heteroaromatic rings can include one or more N, O, or S atoms in the ring. Heteroaromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms.

Optional substitution of any group includes substitution with one or more of the following substituents: halogen, —CN groups, —OCH$_3$, —CF$_3$, —CF$_2$CF$_3$, —CH$_2$CF$_3$, CH$_3$, NO$_2$, CH$_2$R, CH$_2$OR, where R is a C1-C3 alkyl, and other substituents known in the art. In general, an optional substitution means the substitution may or may not be present and that both the non-substituted and substituted substituents are intended to be included to the extent as if they were individually listed, for any purpose, including inclusion or deletion of a particular group or groups from the claims.

Deuterium can be substituted for any H in any group.

As used herein, the term "halo" or "halogen" refers to a halogen group such as a fluoro (—F), chloro (—Cl), bromo (—Br) or iodo (—I).

As is customary and well known in the art, hydrogen atoms in the formulas shown herein are not always explicitly shown.

It should be noted that as used herein and in the appended claims, the singular forms "a", "an", and "the" include plural reference unless the context clearly dictates otherwise. Thus, for example, reference to "an item" includes a plurality of such items and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

As to any of the groups described herein which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

The compounds of this invention may contain one or more chiral centers. Accordingly, this invention is intended to include racemic mixtures, diasteromers, enantiomers and mixture enriched in one or more stereoisomer. The scope of the invention as described and claimed encompasses the racemic forms of the compounds as well as the individual enantiomers and non-racemic mixtures thereof. Regardless of any specific depiction, all possible stereochemical arrangements of the rings of the compounds described herein are intended to be included as if they were specifically exemplified.

The compounds and formulas described herein may be used in liquid crystal display devices as known in the art. Methods of preparing and using liquid crystal display devices, including preparation and use of cells is well known in the art.

As used herein, "liquid crystal composition" or other variants of the phrase is a combination of a liquid crystal host material and a compound of the invention.

As used herein, "single bond" means that two groups are directly attached to each other. For example, when a ring is attached to a substituent with a single bond, there are no intervening groups between the ring and the substituent.

As used herein, the use of a line coming off of a substituent when used as a portion of a molecule is standard in the art and indicates that there is another substituent attached, not necessarily that there is a carbon unit terminating.

The invention is further detailed in the following Examples, which are offered by way of illustration and are not intended to limit the scope of the invention in any manner.

Mixtures

The compounds described herein can be used as components of liquid crystal mixtures, for any type of liquid crystal display, such as twisted cell, guest-host, DAP (deformation of aligned phases), ECB (electrically controlled birefringence), CSH (color super homeotropic), VA (vertically aligned) or IPS (in plane switching) or dynamic scattering. Applications include MVA (multi-domain vertical alignment) displays, in particular MVA-TFT displays, and PALC displays (plasma-addressed LCDs). Although the compounds described herein may be used as additives in positive delta E mixtures, another use are as components of negative delta E nematic liquid crystal mixtures for display applications, and in particular, large format TVs in the VA mode. The compounds described herein can also be used as components of FLC mixtures.

Each liquid-crystal display requires specific physical and chemical properties, such as temperature ranges for the mesophases, dielectric anisotropy ($\Delta\in$), optical anisotropy ($\Delta$n), viscosity, threshold voltage (Vth), thermal stability, and stability to electromagnetic and light radiation. These properties generally cannot be fulfilled using individual compounds, which is why mixtures of usually from 10 to 15 liquid-crystalline or mesogenic compounds are typically used.

In an embodiment, compounds disclosed herein are useful as dopants for negative and positive $\Delta\in$delta LC mixtures (hosts). These mixtures and the use of the compounds described herein as dopants are known in the art, and can be used in both positive and negative delta E nematic LC mixtures, as well as dopants for FLC mixtures.

Some examples of positive $\Delta\in$ nematic liquid crystal mixtures (hosts) include 4-fluorophenyldiphenyl-4'-propane, 3,4-difluorophenylbicyclohexyl-4'-propane, 4-cyanobiphenyl-4'-pentane (5CB). Some examples of negative $\Delta\in$ nematic liquid crystal mixtures include: 2',3'-difluoroterphenyl 1-cyano-1-pentylcyclohexylpentylbenzene, 4-ethoxy-2,3-difluorophenyl-4-bicyclohexyl-4'-propane.

Some examples of negative $\Delta\in$ nematic liquid crystal mixtures include commercially available MLC6608, MLC6609, MLC6610, and MLC6886. The liquid crystal host may be chosen for the particular purpose and physical characteristics desired, as known in the art. Any suitable liquid crystal host, including any negative delta epsilon liquid crystal host may be used. In an embodiment of the nematic liquid crystal composition, the negative delta epsilon liquid crystal host is selected from commercially available hosts including: MLC6608, MLC6886, and mixtures thereof. The primary chemical structures that are used in state-of-the-art VAN LCs are bicyclohexyl difluoro and cyclohexyl biphenyl difluorophenyl, and any other combination of laterally fluorinated core LCs that are currently used in VAN displays. Any of these mixtures and other mixtures known to one or ordinary skill in the art may be used in the methods of the invention.

Some examples of FLC hosts include commercially available host mixture MX40443, which is composed of phenylpyrimidine LCs and 2,3-difluoroterphenyl LCs.

Chiral FLC Host MX40443

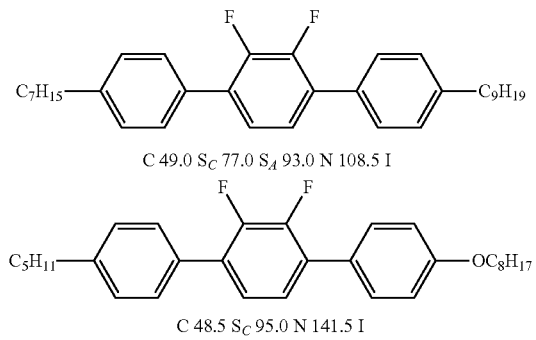

| R | R' | Class | % |
|---|---|---|---|
| OC6H13 | C3H7 | I | 18 |
| OC8H17 | C3H7 | I | 18 |
| OC8H17 | C2H5 | I | 18 |
| OC10H21 | C5H11 | I | 18 |
| OC10H21 | C5H11 | I | 18 |
| C5H11 | C9H19 | II | 10 |

To the achiral host mix above was added 8% chiral dopant below to afford MX40443 with a Ps of 8.5 nC/cm2, electric rise time of 273 μs, and viscosity of rotational 71 mpas.

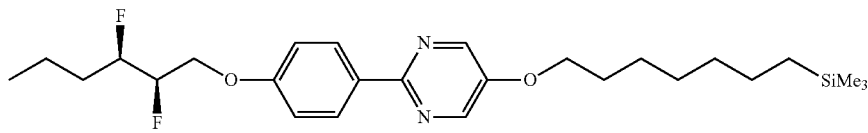 [SMILES: CCC[C@@H](F)[C@H](F)COc1ccc(-c2ncc(OCCCCCCC[Si](C)(C)C)cn2)cc1]

and a phase diagram of I 97 N 91 A 80 C* <20 X

Other examples of FLC hosts include: The FLC host hosts described in Krause et al., U.S. Pat. No. 4,871,472 (issued Oct. 3, 1989) can also be used with the dopants described herein.

Example Host 1

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
7% of 2-p-hexyloxyphenyl-5-nonylpyrimidine,
23% of 2-p-nonyloxyphenyl-5-nonylpyrimidine,
28% of r-1-cyano-1-butyl-cis-4-(4'-octyloxybiphenyl-4-yl)cyclohexane,
14% of r-1-cyano-1-hexyl-cis-4-(4'-heptylbiphenyl-4-yl)cyclohexane,
6% of r-1-cyano-1-(4-pentylcyclohexyl)-cis-4-(4-pentylcyclohexyl)cyclohexane and
10% of 4-[3-chloro-4-octyloxybenzoyloxy]-4'-(2-5 chloro-3-methylbutyryloxy)-biphenyl has a Sc* 78° SA 83° Ch 102° I and a spontaneous polarization Ps of 20 nC/cm2.

Example Host 2

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
7% of 2-p-hexyloxyphenyl-5-nonylpyrimidine,
23% of 2-p-nonyloxyphenyl-5-nonylpyrimidine,
28% of r-1-cyano-1-butyl-cis-4-(4'-octyloxybiphenyl-4-yl)cyclohexane, 14% of r-1-cyano-1-hexyl-cis-4-(4'-heptylbiphenyl-4-yl)cyclohexane,
6% of r-1-cyano-1-(4-pentylcyclohexyl)-cis-4-(4-pentylcyclohexyl)cyclohexane and
10% of 4-[3-cyano-4-octylbenzoyloxy]-4'-(2-chloro-3-methylbutyryloxy)-biphenyl has Sc*75° SA 78° Ch 98° I and a spontaneous polarization Ps of 18 nC/cm2.

Another example of an FLC host based on fluorinated terphenyl system is shown below:

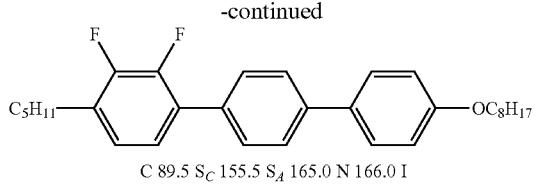

C 49.0 $S_C$ 77.0 $S_A$ 93.0 N 108.5 I

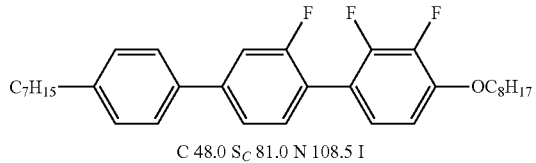

C 48.5 $S_C$ 95.0 N 141.5 I

-continued

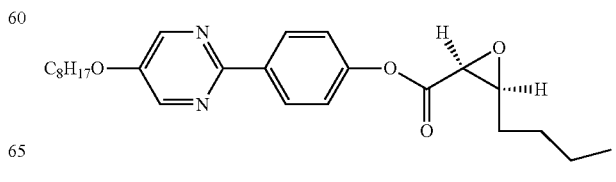

C 89.5 $S_C$ 155.5 $S_A$ 165.0 N 166.0 I

C 48.0 $S_C$ 81.0 N 108.5 I

The terphenyl mixture can be formulated into an excellent low viscosity host in equivalent amounts to afford a phase diagram:

I 118 N 105 SmA 95 SmC −22 X

Adding 5% chiral epoxy ester gives the resulting mixture, MX40018, which showed the following properties:
I 112 N 108 SmA 90 SmC −25 X
a Ps=34 nC/cm2
viscosity of 64 mpas
tilt angle of 22 degrees.
rise time of 120 μs at 5 V.

Provided below is another chart showing Smectic C host materials for formulation of FLC mixtures.

One more compounds described herein may be used in a mixture with other compounds. As is typical in the art, the terms "dopant" or "additive" or other forms of the words are used to indicate the inclusion of one or more compounds disclosed herein with another compound or compounds, such as a liquid crystal mixture. When one or more compounds of the invention is used as a dopant in a mixture of liquid crystals, the mixture is sometimes called the host, as is known in

| R | Crystal | Smectic C | Smectic A | Nematic | Isotropic |
|---|---|---|---|---|---|
| 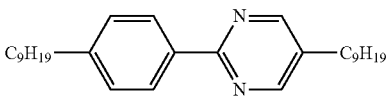 $C_9H_{19}$—⬡—pyrimidine—$C_9H_{19}$ | • 49 | — | • 61 | — | • |
| 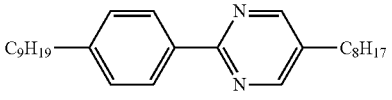 $C_9H_{19}$—⬡—pyrimidine—$C_8H_{17}$ | • 36 | • 52 | • 85 | — | • |
| 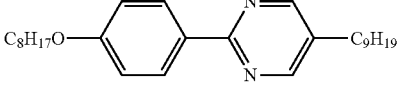 $C_8H_{17}O$—⬡—pyrimidine—$C_9H_{19}$ | • 33 | • 61 | • 75 | — | • |
| 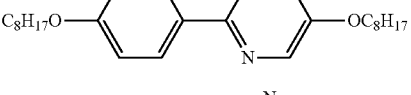 $C_8H_{17}O$—⬡—pyrimidine—$OC_8H_{17}$ | • 51 | • 91 | • 100 | • 101 | • |
| 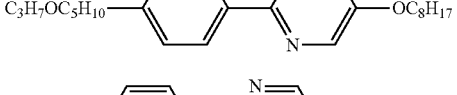 $C_3H_7OC_5H_{10}$—⬡—pyrimidine—$OC_8H_{17}$ | • 8 | • 47 | • 69 | — | • |
| 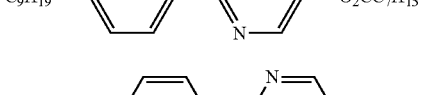 $C_9H_{19}$—⬡—pyrimidine—$O_2CC_7H_{15}$ | • 82 | — | — | — | • |
| 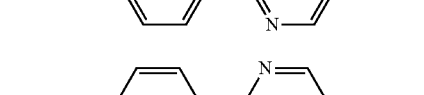 $C_7H_{15}CO_2$—⬡—pyrimidine—$C_9H_{19}$ | • 53 | • 64 | • 65 | — | • |
| 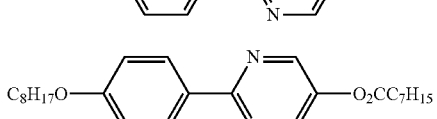 $C_7H_{15}CO_2$—⬡—pyrimidine—$OC_8H_{17}$ | • 74 | • 90 | • 93 | • 94 | • |
| 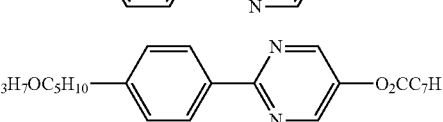 $C_8H_{17}O$—⬡—pyrimidine—$O_2CC_7H_{15}$ | • 69 | • 85 | — | • 96 | • |
| 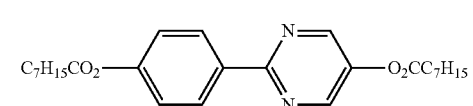 $C_3H_7OC_5H_{10}$—⬡—pyrimidine—$O_2CC_7H_{15}$ | • 70 | — | — | — | • |
|  $C_7H_{15}CO_2$—⬡—pyrimidine—$O_2CC_7H_{15}$ | • 81 | • 93 | — | • 97 | • |

Reference: Kelly and O'Neill. Chapter 1, "Liquid Crystal for electro Optic Applications", Handbook of Advanced Electronic and Photonic Materials and Devices, edited by H. S. Nalwa, Volume 7: Liquid Crystals, Display and Laser Materials, 2000 by Academic Press the art. The terms mixture and host are used synonymously in these applications, as is known in the art.

In an embodiment, compounds disclosed here may be used in any suitable dopant amount, such as 50% or less by weight, 25% or less by weight, 10% or less by weight, 5% or less by weight, 1% or less by weight, and other suitable amounts. All intermediate ranges and individual values of dopant percentages are intended to be included to the same extent as if listed separately.

Liquid crystal mixtures can be prepared using methods known in the art. In general, the components are dissolved in one another, expediently at elevated temperature. By means of suitable dopants, the liquid-crystalline phases can be modified in accordance with the invention so that can be used in all types of liquid-crystal display types. Dopants and their uses are known to those skilled in the art and are described in detail in the literature (H. Kelker/R. Hatz, Handbook of Liquid Crystals, Verlag Chemie, Weinheim, 1980).

Physical Properties

In embodiments, the compounds described herein have properties which make them useful as dopants in liquid crystal mixtures, in an embodiment. A dramatic increase in $\Delta\in$ is shown by the use of multiple fluorines in the system described herein. Each fluorine addition to the compound of Formula I should add from 1 to 2 units to the $\Delta\in$. Therefore, the compounds described herein should have dielectric anisotropy

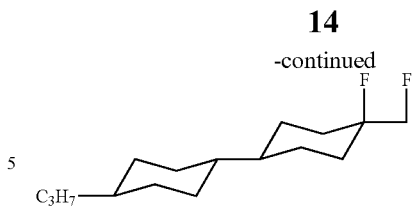

The epoxide was obtained as a crystalline solid. Interestingly, the epoxide itself showed good properties as a dopant in NLC mixtures, lowering the voltage threshold of a 10% mixtures in MLC6609, a negative delta E nematic mixture similar to MLC6608. The difluorocyclohexylpropane compound 20200 was obtained as a waxy solid with a melting point of 62-64 C.

B. Additional Synthesis Methods

Other compounds described herein can be synthesized using methods known in the art. Some of these methods are described below.

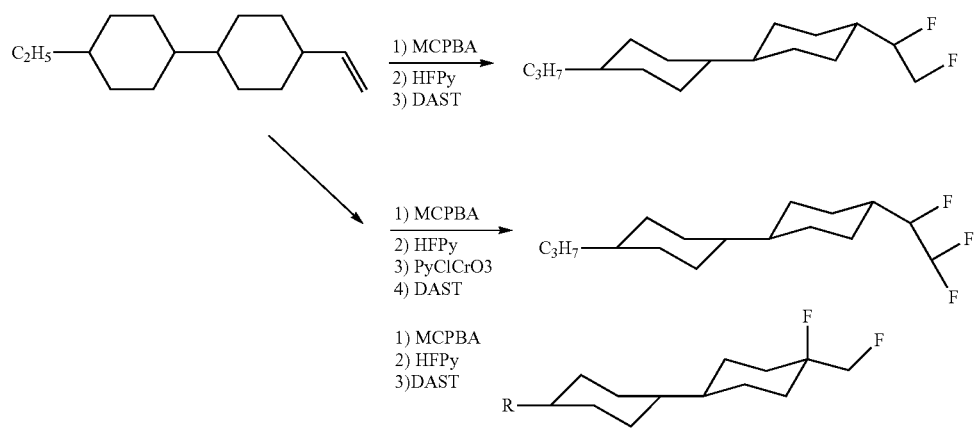

values less than −2, and up to at least −12. All individual values and ranges of $\Delta\in$ between −1 and −12 are intended to be included to the same extent as if they were listed separately. Other useful physical property improvements are found using the compounds of the invention in liquid crystal mixtures or hosts, as described further below.

Synthesis

The compounds described herein may be prepared by methods known in the art.

A. Exemplary synthesis of Compound designated 20200 (1,2-difluoro bicyclohexyl-4'-propane)

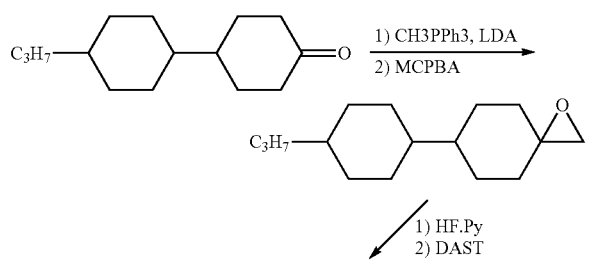

Characterization and Measurement of Physical Properties

Measurement of the physical properties of the compounds described herein and mixtures incorporating compounds described herein can be made using standard equipment and techniques known to those of ordinary skill in the art.

Example 1

Characterization of 1,2-difluoro bicyclohexyl-4'-propane

A 10% mixture of the 1,2-difluoro bicyclohexyl-4'-propane compound was made in a commercial negative E nematic mixture, MLC-8809 (from Merck Ltd) as host. The host showed a delta E of −3.7. Upon measurement of the new mixture, a value of 3.7 was found, indicating the dopant possessed approximately the same value as the host, −3.7, further indicating that the fluorines successfully coupled to form an axial dipole.

Example 2

Additional Characterization Data

In an embodiment, compounds described herein used as dopants in a LC host or mixture provide improvement in one or more physical properties of the LC mixture. Improvement of the rise time is highly desirable in FLC mixtures. In embodiments, the compounds described here, including compound having difluoro groups, enhance the rise time of a LC mixture by up to 79%. In some embodiments described here viscosity is lowered and rise time is improved which are both beneficial in LCD applications. The following data provides examples of the improvement of properties of LC mixtures incorporating the compounds described herein. Unless otherwise indicated, a 10% mixture of the compound and LC mixture is used. Standard test cells were made with the LC mixtures and their electro-optic (EO) characteristics were evaluated. The abbreviations, terms and symbols used in the tables below and elsewhere herein are standard in the art.

The negative delta E nematic host MX40424, is composed of a mixture of equal parts of 2,3-difluorophenylbicyclohexyl and cyclohexylphenyl LC components.

VA Nematic Host MX40424

$$R-\left[\bigcirc-\bigcirc_{F\ F}\right]_m \left[\bigcirc-\bigcirc\right]_n \left[\bigcirc-\bigcirc\right]_o - R'$$

| Composition R | R' | m | n | o | % |
|---|---|---|---|---|---|
| OEt | C3H7 | 1 | 0 | 2 | 20 |
| OEt | C3H7 | 1 | 1 | 1 | 20 |
| OEt | C2H5 | 1 | 0 | 2 | 20 |
| OEt | C5H11 | 1 | 0 | 2 | 20 |
| BuO | C5H11 | 1 | 0 | 1 | 20 |

The phase diagram of MX40424 is I 91 N <10 X.

The other hosts and mixtures listed are 10% doped mixtures of either MX40424 or MX40443, as will be apparent from the context.

TABLE 1

Structures and characterization data for 10% mixtures of Compounds B1 and B2 in hosts

| Compound Structure | Compound | MX # | LCV # | Polarization | % change | Electric Rise Time | % change |
|---|---|---|---|---|---|---|---|
| C3H7—⬡—⬡—⬡-F,F | B1 | 40452 | 20200 | 4.5 | 48.6 | 306 | −7.8 |
| C3H7—⬡—⬡—⬡—CHF-CH2F | B2 | 40454 | 20180 | 1.7 | 80.3 | 59 | 79.4 |

TABLE 2

| | LCV # | Electric Rise Time | % Change | Applied Electric Field | % change | Resistivity | % change | ε | % change | γ | % change |
|---|---|---|---|---|---|---|---|---|---|---|---|
| B1 | 20280 | 200 | 29.63 | 5.95 | −0.08 | 5.82E+10 | −15.25 | 3.71 | 2.88 | 120 | −67.86 |
| B2 | 20430 | 529.8 | −86.42 | 5.7 | 4.12 | 1.14E+11 | −125.74 | 3.64 | 4.71 | 81.5 | −14.00 |

TABLE 3

Nematic LCAS Analysis for Compounds B1 and B2
The Table below shows the change in the threshold voltage of a nematic liquid crystal host MX40451 and 40453 when 10% of either compound B1 or B2 is added. Addition of the dopant has either no effect or a lowering effect on the threshold voltage, which is beneficial for LC devices.

| Compound Structure | Comp # | MX # | LCV # | Vth | % change |
|---|---|---|---|---|---|
| C3H7—⬡—⬡—⬡-F,F | B1 | 40451 | 20200 | 2.00 | 0.00 |
| C3H7—⬡—⬡—⬡—CHF-CH2F | B2 | 40453 | 20180 | 1.90 | 5.00 |
| | | | | host avg | 2.00 |

TABLE 4

Physical properties of 10% mixtures of compounds B1 and B2 in nematic host MX40424

| | LCV # | E parallel | E perpendicular | Delta E | % change | K11 | % change | K33 | % change |
|---|---|---|---|---|---|---|---|---|---|
| B1 | 20200 | 3.33 | 6.86 | −3.53 | 8.07 | 18 | −0.84 | 12.8 | 8.57 |
| B2 | 20180 | 3.59 | 7.08 | −3.49 | 9.11 | 13.9 | 22.13 | 11.3 | 19.29 |
| | host avg | | | −3.84 | | 17.85 | | 14 | |

| | LCV # | K33/K11 | % change | Viscosity | % change | K22 |
|---|---|---|---|---|---|---|
| B1 | 20200 | 0.17 | 78.48 | 167 | 6.70 | 7.59 |
| B2 | 20180 | 0.82 | −3.80 | 162 | 9.50 | 6.79 |
| | host avg | 0.79 | | 179 | | |

A 10% mixture of compound C1 was made in FLC host 40443. Characterization data is presented below in Tables 5 and 6.

TABLE 5

FLC LCAS Analysis Compound C1

| Compound Structure | Compound # | MX # | LCV # | Polarization | % change |
|---|---|---|---|---|---|
| C$_3$H$_7$—⬡—⬡—⬡⟨F,F⟩ | C1 | 40456 | 20432 | 4.57 | 47.26 |
| | | 40443 | FLC host | 8.7 | |

TABLE 6

Characterization data for Compound C1

| | LCV # | Electric Rise Time | % Change | Applied Electric Field | % change | Resistivity | % change | ε | % change | γ | % change |
|---|---|---|---|---|---|---|---|---|---|---|---|
| C1 | 20432 | 249 | 12.39 | 6.01 | −1.09 | 4.84E+10 | 4.16 | 3.82 | 0.00 | 23.99 | 66.44 |
| | FLC host | 284.2 | | 5.945 | | 5.05E+10 | | 3.82 | | 71.49 | |

A 10% mixture of Compound C1 was made in FLC host 40455. Characterization data is presented below in Tables 7 and 8.

TABLE 7

Compound C1 in a nematic Liquid Crystal

| Nematic LCAS Analysis Compound Structure | Compound # | MX # | LCV # | Vth | % change |
|---|---|---|---|---|---|
| C$_3$H$_7$—⬡—⬡—⬡⟨F,F⟩ | C1 | 40455 | 20432 | 2.00 | 0 |
| | | | host avg | 2.00 | |

TABLE 8

| LCV # | E parallel | E perpendicular | Delta E | % change | K11 | % change | K33 | % change |
|---|---|---|---|---|---|---|---|---|
| C1 | 40455 | 3.39 | 3.39 | 7.11 | −3.72 | 3.125 | 17.9 | −0.28 | 13.6 |
| | | | | | −3.84 | | 17.85 | | 14 |

| | LCV # | K33/K11 | % change | Viscosity | % change | | K22 |
|---|---|---|---|---|---|---|---|
| C1 | 40455 | 2.86 | 0.76 | 3.80 | 197 | −10.06 | 8.01 |
| | | | 0.79 | | 179 | | |

TABLE 9

Phase diagrams

| Group # | MX # | LCV # | I | N | SmA | SmC |
|---|---|---|---|---|---|---|
| FLC | | | | | | |
| | 40443 | FLC host | 97.0 | 91.1 | 80.1 | |
| B1 | 40452 | 20200 | 95.7 | 88.8 | 41.0 | |
| B2 | 40454 | 20180 | 87.8 | 79.3 | | |
| C1 | 40456 | 20432 | 91.4 | 82.8 | 60.2 | |
| Nematic | | | | | | |
| | 40424 | Nematic host | 92.2-85.0 | | | |
| B1 | 40451 | 20200 | 95.8-90.0 | | | |
| B2 | 40453 | 20180 | 85.7-79.2 | | | |
| C1 | 40455 | 20432 | 95.5-85.0 | | | |

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

All possible ionic forms of molecules described herein and salts thereof are intended to be included individually in the disclosure herein.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, reagents, synthetic methods, purification methods, analytical methods, assay methods, and devices other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims. Any composition or compound that is claimed and that is described in the literature with an enabling disclosure is not intended to be included in the claims and it is intended that specific support is provided to exclude a compound or class of compounds from the claims.

The disclosures of the publications listed herein including the publications listed below are herein incorporated by reference in their entireties.

All patents and publications mentioned in the disclosure are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the disclosure, for example, a temperature range, a time range, or a composition range, all intermediate ranges and subranges, as well as all individual values included in the ranges given are intended to be included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention including as defined by any claims provided.

In general the terms and phrases used herein have their art-recognized meaning, which can be found by reference to standard texts, journal references and contexts known to those skilled in the art. The definitions are provided to clarify their specific use in the context of the invention.

One skilled in the art readily appreciates that the present invention is well adapted to carry out the objects and obtain the ends and advantages mentioned, as well as those inherent in the present invention. The methods, components, materials and dimensions described herein as currently representative of preferred embodiments are provided as examples and are not intended as limitations on the scope of the invention. Changes therein and other uses which are encompassed within the spirit of the invention will occur to those skilled in the art, are included within the scope of the claims.

Although the description herein contains certain specific information and examples, these should not be construed as limiting the scope of the invention, but as merely providing illustrations of some of the embodiments of the invention. Thus, additional embodiments are within the scope of the invention.

I claim:

1. A compound having Formula I:

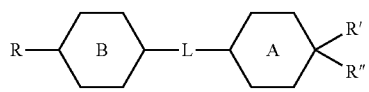

Formula I where in Formula I R' is H or F; R" is —F, —CH2-F, —CHFCH2F, —CHFR$^a$, or

wherein R$^a$ is hydrogen or an alkyl group which has 1-8 C atoms in which any non-adjacent —CH2- groups are optionally replaced by one or more of O atoms, —CO— groups, —CO—O— groups or —CH=CH— groups, and which alkyl group is optionally substituted with one or more halogen atoms which may be the same or different;
the A ring is a cyclohexyl ring, and the B ring is one or more rings selected from the group consisting of: cyclohexyl; cyclohexenyl; phenyl; biphenyl; pyrimidinyl; pyridinyl; pyrazinyl; thiadiazolyl; naphthalenyl; dioxanyl; tetrahydropyranyl; dithianyl; or tetrahydrothiopyranyl; where any ring may independently include one or more substitutions including halogen;
L is selected from a single bond, —CH2CH2-, —CH=CH—, —C≡C—, —CO2-, —O2C—, —CF2O—, and —OCF2-;
R is hydrogen or an alkyl group which has 1-8 C atoms in which any non-adjacent —CH2- groups are optionally replaced by one or more of O atoms, —CO— groups, —CO—O— groups or —CH=CH— groups, and which alkyl group is optionally substituted with one or more halogen atoms which may be the same or different.

2. The compound of claim 1, wherein R" is —F, —CH2-F, —CHFCH2F, or

3. The compound of claim 1, wherein independently in R and R$^a$, one or two non-adjacent —CH2- groups are optionally replaced by one or more of O atoms, —CO— groups, —CO—O— groups or —CH=CH— groups, and which alkyl group is optionally substituted with one or more halogen atoms which may be the same or different.

4. The compound of claim 1, having Formula II

Formula II wherein the A ring is a cyclohexyl ring, and the B ring is one or more rings selected from the group consisting of: cyclohexyl, cyclohexenyl, phenyl; biphenyl; pyrimidinyl, pyridinyl; pyrazinyl, thiadiazolyl; naphthalenyl; dioxanyl; tetrahydropyranyl; dithianyl; or tetrahydrothiopyranyl where any ring may independently include one or more substitutions including halogen; L is selected from a single bond, —CH2CH2-, —CH=CH—, —C≡C—, —CO2-, —O2C—, —CF2O—, and —OCF2-;
R is an alkyl group which has 1-8 C atoms and in which one or two non-adjacent CH2 groups are optionally replaced by one or more of O atoms, —CO— groups, —CO—O— groups or —CH=CH— groups, and which alkyl group is optionally substituted with one or more halogen atoms which may be the same or different.

5. The compound of claim 1 having Formula III:

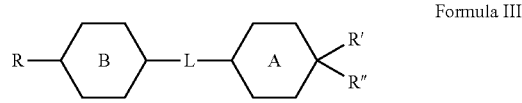

Formula III wherein in Formula III the A ring is a cyclohexyl ring, and the B ring is a cyclohexyl ring where any ring may independently include one or more substitutions including halogen; L is selected from a single bond, —CH2CH2-, —CH=CH—, —C≡C—, —CO2-, —O2C—, —CF2O—, and —OCF2-;
R is an alkyl group which has 1-8 C atoms and in which one or two non-adjacent CH2 groups are optionally replaced by one or more of O atoms, —CO— groups, —CO—O— groups or —CH=CH— groups, and which alkyl group is optionally substituted with one or more halogen atoms which may be the same or different;
R' is —H or —F; R" is —H, —F, —CH2-F, —CHFCH2F, or

6. The compound of claim 1 having Formula IV:

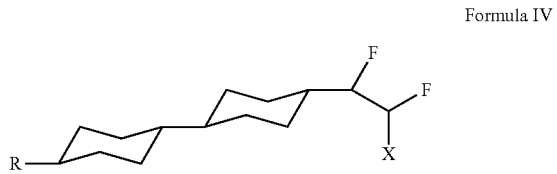

Formula IV where in Formula IV X is F, H, or C1-C8 alkyl; R is an alkyl group which has 1-8 C atoms and in which one or two non-adjacent CH2 groups are optionally replaced by one or more of O atoms, —CO— groups, —CO—O— groups or —CH=CH— groups, and which alkyl group is optionally substituted with one or more halogen atoms which may be the same or different.

7. The compound of claim 1 having the structure:

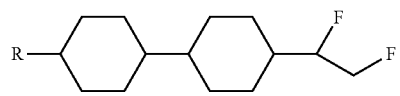

where R is an alkyl group which has 1-8 C atoms and in which one or two non-adjacent CH2 groups are optionally replaced one or more of O atoms, —CO— groups, —CO—O— groups or —CH=CH— groups, and which alkyl group is optionally substituted with one or more halogen atoms which may be the same or different.

8. The compound of claim 7, having the structure:

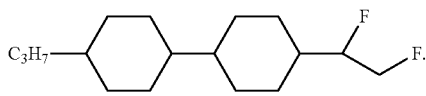

9. The compound of claim 1 having the structure:

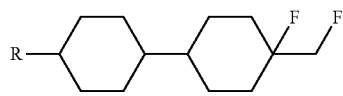

where R is an alkyl group which has 1-8 C atoms and in which one or two non-adjacent CH2 groups are optionally replaced one or more of O atoms, —CO— groups, —CO—O— groups or —CH=CH— groups, and which alkyl group is optionally substituted with one or more halogen atoms which may be the same or different.

10. The compound of claim 8 having the structure:

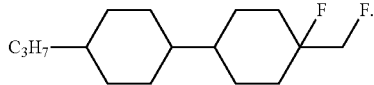

11. The compound of claim 1 having the structure

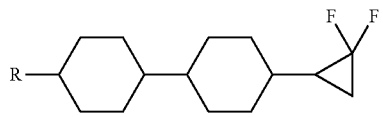

where R is an alkyl group which has 1-8 C atoms and in which one or two non-adjacent CH2 groups are optionally replaced one or more of O atoms, —CO— groups, —CO—O— groups or —CH=CH— groups, and which alkyl group is optionally substituted with one or more halogen atoms which may be the same or different.

12. The compound of claim 11 having the structure

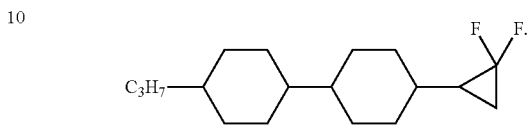

13. A liquid crystal composition comprising one of more compounds of claim 1.

14. A liquid crystal composition comprising one of more compounds of claim 1 and a LC host.

15. The liquid crystal composition of claim 13, wherein the composition is a nematic liquid crystal.

16. The liquid crystal composition of claim 13, wherein the composition is a FLC liquid crystal.

17. The liquid crystal composition of claim 14, which has a lower freezing point than the LC host without the one or more compounds of claim 1.

18. The liquid crystal composition of claim 14, where the threshold voltage is not increased as compared to the LC host without the one or more compounds of claim 1.

19. A liquid crystal display device comprising a liquid crystal composition of claim 13.

* * * * *

UNITED STATES PATENT AND TRADEMARK OFFICE
CERTIFICATE OF CORRECTION

PATENT NO.       : 8,778,223 B2
APPLICATION NO.  : 13/479550
DATED            : July 15, 2014
INVENTOR(S)      : Michael Wand It is certified that error appears in the above-identified patent and that said Letters Patent is hereby corrected as shown below:

In the Claims

Claim 7, column 24, lines 63 through 64, replace "replaced one or more of O atoms," with --replaced with one or more O atoms,--.

Claim 9, column 25, line 18, replace "replaced one or more of O atoms," with --replaced with one or more O atoms,--.

Claim 11, column 26, line 3, replace "replaced one or more of O atoms," with --replaced with one or more O atoms,--.

Claim 13, column 26, line 17, replace "comprising one of more" with --comprising one or more--.

Claim 14, column 26, line 19, replace "comprising one of more" with --comprising one or more--.

Claim 19, column 26, line 32, replace "comprising a liquid" with --comprising the liquid--.

Signed and Sealed this
Twenty-fifth Day of November, 2014

Michelle K. Lee
*Deputy Director of the United States Patent and Trademark Office*